United States Patent [19]

Floyd et al.

[11] 4,068,307
[45] Jan. 10, 1978

[54] MILE POST LOCATION DISPLAY SYSTEM

[75] Inventors: Robert D. Floyd, Dallas; Lee V. Gorman, Garland, both of Tex.

[73] Assignee: David Floyd, Dallas, Tex.

[21] Appl. No.: 683,759

[22] Filed: May 6, 1976

[51] Int. Cl.² .................... G06F 15/20; G01C 22/00
[52] U.S. Cl. ............................. 364/424; 116/28 R; 235/92 DN; 235/92 PE; 235/95 R; 364/460
[58] Field of Search .......... 235/151.32, 150.2, 150.27, 235/92 DN, 92 TC, 95 R, 97, 61 J; 340/56, 366 R, 22, 23; 73/490; 116/28 R, 29

[56] References Cited

U.S. PATENT DOCUMENTS

| 3,789,198 | 1/1974 | Henson et al. | 235/150.27 |
| 3,821,523 | 6/1974 | Chisholm et al. | 235/150.27 |
| 3,865,305 | 2/1975 | Sampey | 235/92 DN |
| 3,872,288 | 3/1975 | Sampey | 235/92 DN |
| 3,967,098 | 6/1976 | Harnagel et al. | 235/150.27 |

Primary Examiner—Malcolm A. Morrison
Assistant Examiner—Errol A. Krass
Attorney, Agent, or Firm—Richards, Harris & Medlock

[57] ABSTRACT

This specification discloses a mile post location system particularly useful with a vehicle having a citizens band radio. The system includes a keyboard having switches which are representative of numbered digits, such that the vehicle operator may input an initial mile post designation indicative of the present location of the vehicle. The keyboard further includes switches to enable the vehicle operator to input incrementing or decrementing instructions. A computer circuit is responsive to the operation of the keyboard switches in order to store the initial mile post designation and the incrementing or decrementing instructions. A transducer is responsive to the distance traveled by the vehicle in order to generate and apply signals to the computer circuit. In response thereto, the computer circuit causes the initial mile post designation to be incremented or decremented in accordance with the stored instructions. A display is responsive to the computer circuit for displaying to the vehicle operator the last mile post passed by the vehicle in order to enable the vehicle operator to broadcast his present location on the citizens band radio.

10 Claims, 3 Drawing Figures

U.S. Patent   Jan. 10, 1978   4,068,307
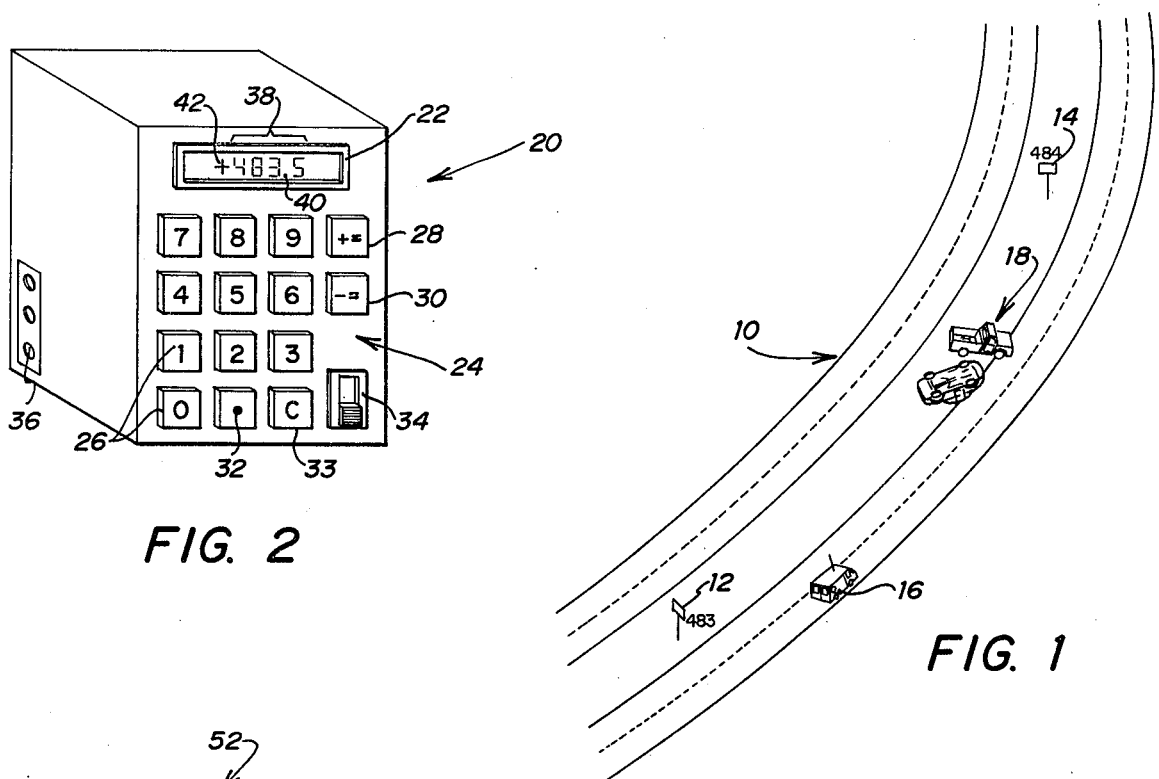
FIG. 2
FIG. 1
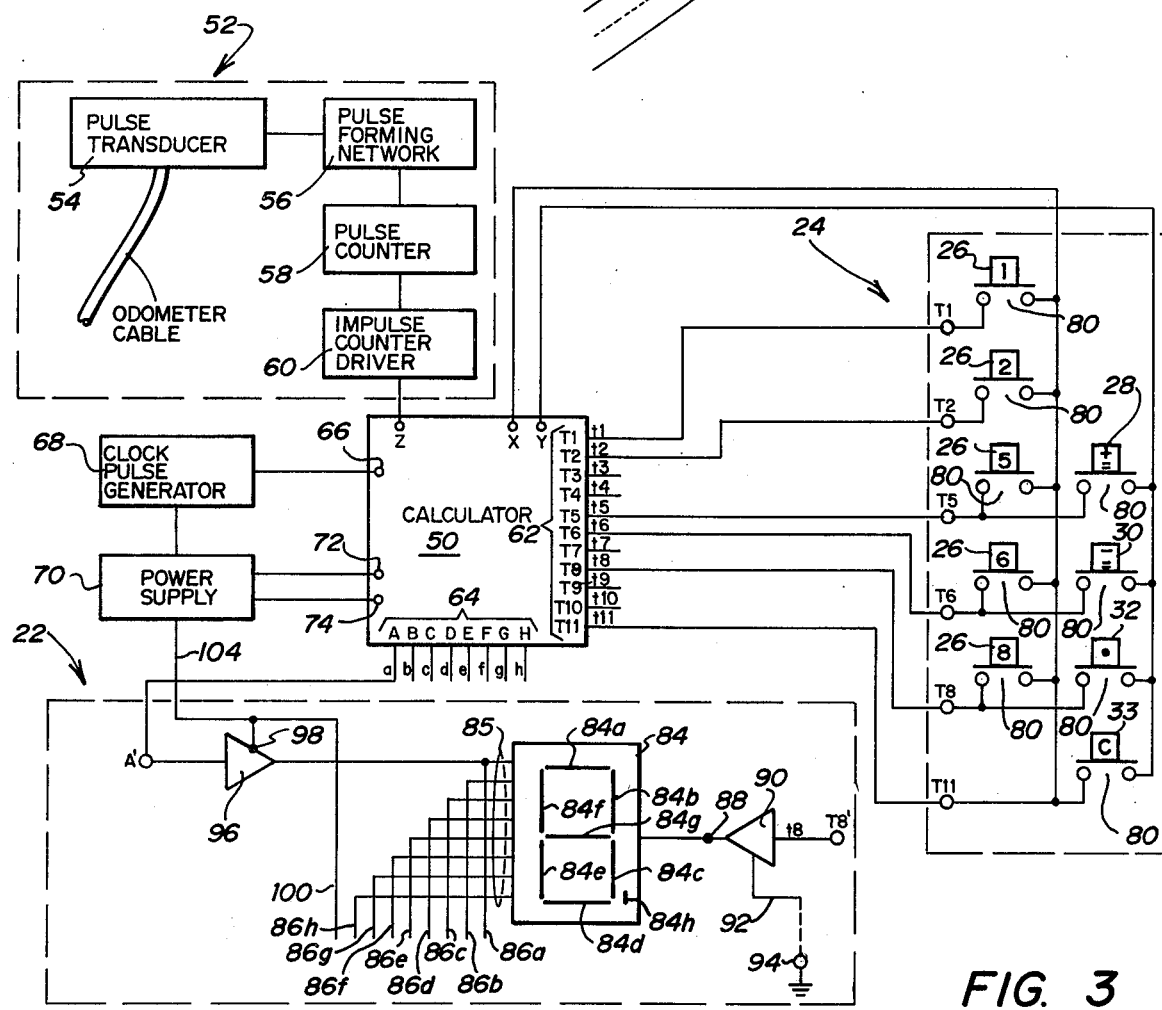
FIG. 3

MILE POST LOCATION DISPLAY SYSTEM

FIELD OF THE INVENTION

This invention relates to location systems, and more particularly relates to a location display system for indicating the relative position of a vehicle to mile post markers on a highway.

THE PRIOR ART

Citizens band radios are commonly used in a large number of vehicles. Such radios are used by the vehicle operators to report accidents along the highway and to provide communications between vehicles regarding weather conditions, road conditions and the like. When reporting accidents or other conditions along a highway, it is important that the citizens band radio operator be able to specifically identify a particular location along the highway. A common technique for providing such a location identification is by identifying the closest mile post marker, such markers being located at periodic intervals along many highways. These mile post markers are each provided with a unique identifying number and may be spaced apart by quarter mile or mile intervals.

In the past, to know a particular location, vehicle operators have been required to remember the number of the mile post marker just passed by the vehicle or the operators have had to wait until the next mile post marker is passed. In addition, the vehicle operator has been required to remember whether or not the numbers on the mile post markers are incrementing or decrementing in order to provide an accurate indication of the vehicle location. Because of these requirements on the vehicle operator, mile post markers have not been completely satisfactory as a method for providing location information and erroneous and delayed location information has thus sometimes resulted from use of such markers. A need has thus arisen for a system to enable a vehicle operator to have a continuous display to the vehicle's location with respect to the nearest mile post marker.

DESCRIPTION OF THE DRAWINGS

For a more complete understanding of the present invention and for further objects and advantages thereof, reference is now made to the following description, taken in conjunction with the accompanying drawings, in which:

FIG. 1 is a somewhat diagrammatical illustration of a highway having mile post markers and showing a typical accident scene wherein it is important to be able to specifically identify a location relative to mile post markers;

FIG. 2 is a prospective view of a location display system in accordance with the present invention; and FIG. 3 is a detailed block diagram of the present system.

DESCRIPTION OF THE PREFERRED EMBODIMENT

Referring to FIG. 1, a diagrammatic illustration of a typical utilization of the present invention is shown. A divided highway 10 is shown which is typical of most interstate and state highways in that mile post or mileage markers are placed along the highway to enable highway drivers to locate their position along the route. For example, mileage marker or mile post 12 representing mile number 483 and mile post 14 representing mile number 484 are spaced at a mile interval along the highway 10. In some cases, the mile posts are spaced apart by one quarter mile. The present invention allows the driver of an automobile 16 to immediately and accurately report the location of the automobile collision 18 over his citizens band radio.

With the present invention, the driver of automobile 16 need not remember the last mile post he has driven past, nor must he wait until reaching the next mile post in order to report an accident somewhere between mile post 483 and mile post 484. Any delay by the driver of automobile 16 in ascertaining the exact location of the collision 18 and broadcasting the location over his citizens band radio lengthens the time in which emergency aid can be dispatched to the victims of the collision. By utilizing the mile post location display system of the present invention, the driver can easily determine the exact location of the collision 18 by viewing the console unit 20 (FIG. 2) which shows the collision to have occurred at mile number 483.5, or midway between mile post 483 and mile post 484.

Referring to FIG. 2, the console unit 20 includes a mileage marker display 22 and a keyboard 24. Keyboard 24 corresponds in general to those of the well known pocket calculators, such as those manufactured and sold by Texas Instruments, Incorporated, Dallas, Tex., under the designation Electronic Calculator TI-2500. The keyboard 24 includes ten push-buttons 26 thereon representing the numerals 0-9, so that the console unit 20 can be preprogrammed with the desired mile post number by the user. The keyboard 24 also includes pushbuttons 28 and 30 which are used to program whether the mile post markers are increasing or decreasing in number as the driver approaches them. These push-buttons, 26, 28 and 30, together with a push-button 32 representing a decimal point, are used in the preprogramming step to be subsequently described.

The keyboard 24 further includes a clear push-button 33 used to reset the console unit 20 before beginning a new journey or when a new highway is entered. An on/off power control switch 34 is mounted on the front of the console unit 20 for controlling the power supplied through terminal 36 located at the side of the console unit 20. Terminal 36 is interconnected to the electrical supply system on the automobile for supplying power to the system. Terminal 36 is also interconnected to a pulse transducer system, to be subsequently described, for supplying an input signal to the console unit 20.

The console unit 20 further includes a display 22 which provides an array of digits 38 with a movable decimal point 40 and a plus or minus sign shown at 42. The digits 38 are common seven-segment type digits and may be formed from light emitting diode arrays, liquid crystals or other suitable low power consumption display units.

To operate the location display system of the present invention the automobile operator will initially depress the clear push-button 33 to initialize the system to receive data. While driving on the interstate highway, the automobile operator will note at least two mileage posts that are driven past. It is necessary to observe two such mileage posts to determine whether the mileage post markers are decreasing or increasing in number as the automobile operator approaches them. Upon determining, for example, that the mileage posts are increasing in magnitude, the operator will depress push-button 28 to indicate a plus sign in the display 22 at 42 and to program the arithmetic operation performed by the system to be addition. The operator will then depress the necessary push-buttons 26 to preprogram the console unit 20 with the number indicated on the next approached mile post indicator. The operator will depress the push-buttons 26 at approximately the point at which his automobile is parallel to the mile post, in order to synchronize the console unit 20 with the mile posts along the highway. Thereafter, the console unit 20 will be incremented by tenths of a mile to indicate to the automobile driver his location along the highway relative to the mile posts. This information may be relayed to others via a citizens band radio.

In addition to the above-mentioned use, the automobile operator can also use the present system to record the number of miles traveled in a given journey. The operator will initially program the console unit 20 by depressing the pushbutton 26, representing the numeral 0, to indicate the start of the journey and push-button 28 to indicate the addition function. Thereafter, the pulse transducer network will cotinuously increment the console unit 20 to display the elapsed mileage traveled from the beginning of the journey. The console unit 20 can then be cleared by depressing push-button 33 to begin recordation of elapsed mileage in a subsequent journey.

The console unit 20 may also include an arithmetic division function which can be utilized to calculate miles traveled per gallon of gasoline consumed. The automobile operator will utilize the console unit 20 to calculate the lapsed mileage traveled between gasoline fill-ups. The divide function push-button will then be depressed and the number of gallons of gasoline needed to travel that distance will be entered using push-buttons 26. The calculator 50 within the console unit 20 will then perform the division function and the resulting miles traveled per gallon of gasoline will be displayed on the display 22.

Referring to FIG. 3, a detailed block diagram of the present system is shown. The system utilizes a calculator 50, which may be a one-chip calculator unit that is internally programmed by the manufacturer, for example, Model TMS 1802 manufactured by Texas Instruments, Incorporated. Input to the calculator 50 is supplied by a pulse transducer system 52, which provides a continuous input measured in tenths of a mile traveled by the automobile from an initial starting point.

The pulse transducer system 52 comprises a pulse transducer 54, which may be actuated by gears rotated by the vehicle odometer cable, or by a wheel or other part of the vehicle which rotates according to the speed of the vehicle. Transducer 54 may comprise any one of a number of conventional magnetic, electrical or mechanical transducers which generate electrical pulses proportional to the rotation of the vehicle wheels. For example, a magnet may be mounted on a wheel of the vehicle and a magnetic sensor, adjustable for wheel size, may be mounted to the vehicle frame. The magnetic sensor is operable to generate pulses in response to the magnetic field of the magnet as the magnet rotates past the sensor. The pulses generated by pulse transducer 54 are fed to a pulse forming network 56, where the pulses are formed, shaped and if necessary amplified. The output of the pulse forming network 56 is supplied to the pulse counter 58 which is adjustable to produce an output electrical signal and to recycle upon the accumulation of pulses corresponding to the predetermined distance of one-tenth mile. The output of the pulse counter 58 is supplied to an impulse counter driver 60, whose output signal is applied to the Z input terminal of calculator 50.

The calculator 50 includes a group of input signal terminals 62 denoted as T1-T11 with corresponding signal lines t1-t11. A group of output terminals 64 denoted as A-H with corresponding signal lines a-h is also included within the calculator 50. Electrical input signals from keyboard 24 are supplied to the calculator 50 through terminals X and Y. Further inputs to the calculator 50 include an input at terminal 66 from the clock pulse generator 68, which is used to gate each operation of the calculator 50. Power is supplied by the power supply 70 through input terminals 72 and 74. The circuitry for the display 22 is also shown in FIG. 3 and is interconnected to terminals 62 and terminals 64. One of the light emitting diodes comprising the display 22 is illustrated, it being understood that the other light emitting diodes comprising the display 22 are similarly interconnected within the system.

When the calculator 50 is energized and operating, it generates a plurality of sequentially occurring pulse signals which are identified using the terminal designations T1-T11. The signals T1-T11 occur individually, that is, only one of the signals T1-T11 is "on" or positive at any one time, all the remaining ones of signals T1-T11 being "off". The signals T1-T11 occur in sequence at a high rate and after each of the signals has occurred, the signals repeat, again occurring individually and in the same sequence.

The signals T1-T11 appearing at terminals 62 are applied to the keyboard 24 along their respective lines t1-t11. All of the switches 80 of the keyboard 24 are normally open, single pole, single throw switches and are manually operable by means of the push-buttons 26 on keyboard 24. FIG. 3 illustrates the push-buttons representing numerals 1, 2, 5, 6 and 8, and it will be understood that the remaining push-buttons are similarly interconnected to the calculator 50. None of the signals T1-T11 applied to the keyboard 24 from the calculator 50 normally pass therethrough to the calculator 50 input terminals X and Y. However, when a particular one of the switches 80 of the keyboard 24 is closed, the circuit is completed between a predetermined one of the input signal lines t1-t11 between the calculator and keyboard 24 and the output line of terminal X. Closure of one of the function pugh-buttons 28, 30, 32 or 33 completes a connection between the signal lines t5, t6, t8 and t11, respectively, generating an input to the calculator 50 at terminal Y. The electrical signals applied to terminals X and Y are thus representative of the push-button switches being depressed.

Simultaneously with the occurrence of one of the input signals T1-T11, the calculator 50 generates signals at its output terminal A-H along signal lines a-h which are applied to the light emitting diodes of the display 22 at terminals A'-H' respectively. One such light emitting diode 84 and its related circuitry is illustrated in FIG. 3, the remaining diodes being omitted for clarity of illustration. Light emitting diode 84 includes input terminals 85 and is interconnected to the remaining diodes through signal buss lines 86a -86h. Light emitting diode 84 includes eight segments, 84a -84g, which can be illuminated to form numerals 0-9, and segment 84h which can be illuminated to form the decimal point 40 (FIG. 2). Each segment 84a-84h can be selectively illuminated or extinguished by generating the proper signal combination at the output terminals A-H of calculator 50 thereby forming the digits 0-9 and the decimal point. For example, the digit "7"is formed by segments 84a, 84b, and 84c.

As previously stated, each light emitting diode 84 includes a plurality of input terminals 85 and also includes common terminals 88. Coupled between the common terminals 88 of the light emitting diode 84 and the input signal lines t1-t11 via terminals T1'-T11', respectively, is a group of digit driver amplifiers 90, the remaining digit driver amplifiers being omitted for clarity of illustration. Each of the digit driver amplifiers 90 includes a common load output terminal as at 92 coupled in common to a ground terminal as at 94.

All of the similar segments 84a -84h of the light emitting diodes 84 are coupled in common. That is, all the segments 84a are connected via buss 86a, all the segments 84b are coupled together via buss 86b. Similarly, all the similar segments 84c-84h are connected in common via busses 86c-86h, respectively. Coupled between busses 86a-86h and the output signal lines a-h are a plurality of segment driver amplifiers 96, the remaining amplifiers being omitted for clarity of illustration. Each of the segment driver amplifiers 96 is provided with a load input terminal at 98, all input terminals 98 being connected in common to a supply buss 100. Power supply buss 104 from the power supply 70 is also connected to supply buss 100.

Segment driver amplifiers 96 are operable between "on" and "off" conditions, they being rendered "on" in response to reception of respective ones of signals A-H via input terminals A'-H' and rendered "off" in absence thereof. When segment driver amplifiers 96 are on, they complete an electrical path between their load input terminals 98 and respective ones of segment busses 86a-86h, respectively and thereby apply the supply potential to the respective segments 84a-84h of the light emitting diodes 84.

Digit driver amplifiers 90 are also operable between "on" and "off" conditions. When in the "on" or conductive condition, the digit driver amplifiers 90 complete an electrical circuit between their terminals 88 and the ground buss 92 and, conversely, when in an "off" condition, disconnect the respective input terminals 88 from the ground buss 92. Digit driver amplifiers 90 are rendered "on" and "off", respectively, in response to reception of or absence of one of signals T1-T11 at input terminals T1'-T11'.

To complete an electrical circuit through a particular one of the light emitting diode segments 84a-84h of the light emitting diodes 84, it is necessary that the particular segment driver amplifiers 96 coupled to the segment be "on" and the particular digit driver amplifiers 90 coupled to the light emitting diodes 84 must be "on".

Since input signals T1-T11 occur individually in sequence, it is apparent that only a single one of the digit driver amplifiers 90 will be in an "on" condition at any one time. It will also be apparent that a particular group of signals A-H will render predetermined ones of segment driver amplifiers 96 "on" at any one time.

For example, it will be seen that upon the occurrence of signal T8 at terminal X, there simultaneously occur output signals A-H generated by calculator 50. Correspondingly, these signals render the digit driver amplifier 90 connected to terminal T8' "on" and segment driver amplifiers 96 corresponding to terminals A'-G' "on". The remaining digit driver amplifiers 90 corresponding to terminals T1'-T7' and T9' remain "off". Under these conditions, supply potential will be applied to segments 84a-84g of the light emitting diode 84 and common terminal 88 thereof will be coupled to ground. This in turn will produce a flow of current through segments 84a-84g of the light emitting diode 84 thereby illuminating these segments to display the decimal digit "8". In a similar manner during the occurrence of signals T1-T7 and T9, and using the output signal groups generated by the calculator 50 at terminals A-H, the digits 1-7 and 9 will be displayed on the light emitting diodes 84 respectively Thus it can be seen that the illumination of a particular digit on a particular one of light emitting diodes 84 is the result of the simultaneous reception of a particular one of the input signals T1-T9 and a particular group of output signals A-H. The segments of only one of the diodes 84 will be illuminated at any one instant since only one of the diodes 84 will at any instant be coupled to ground by the digit drivers 90.

Calculator 50 operates to perform the desired arithmetic operation according to the input function signal appearing at terminal Y. The output signal of the transducer system 52 is applied to the Z input terminal of calculator 50. The automobile operator will initialize the calcultor 50 by depressing the required push-buttons 26 on keyboard 24, thereby generating electrical input signals at terminal X and terminal Y. The initial mile post designation will then appear on the display 22 as previously described. Thereafter, the calculator 50 will either add or subtract the input signal received at terminal Z from the transducer system 52 responsive to the distance traveled by the vehicle from the initial mile post designation received at terminal X. The result of this reoccurring arithmetic calculation will then be displayed on the display 22, which represents the current location of the automobile by simultaneously turning "on" selective ones of segment driver amplifiers 94 and digit driver amplifiers 90 to illuminate the light emitting diode segments 84a-84h.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. A mile post location system for a vehicle having citizens band radio comprising:
   input means having switches representative of a number of digits to enable the vehicle operator to selectively input any one of a plurality of initial mile post designationss indicative of an initial loction of the vehicle,
   said input means further including a switch to enable incrementing or decrementing instructions to be input by the vehicle operator,
   distance determining means responsive to the distance traveled by the vehicle, and
   a display responsive to said switches and said distance determining means for displaying to the vehicle operator the number of the last mile post passed by the vehicle to enable the vehicle operator to broadcast his present location on the citizens band radio.

2. A location display system for a vehicle comprising:
   transducer means for generating an electrical output signal which varies in accordance with rotation of a wheel of the vehicle;
   mileage setting means accessible to the vehicle operator and including numerical digit and function keys operable for generating input signals representative of a mile post designation and incrementing or decrementing instructions;

calculator means responsive to said input signals and said transducer electrical output signal for performing arithmetic calculation on said signals and for generating an electrical output signal representing the position of the vehicle relative to said mile post designation; and a display coupled to said calculator means for visually displaying said output signal generated by said calculator means.

3. The location display system of claim 2 wherein said display for visually displaying said output signal generated by said calculator means comprises an array of light emitting diodes.

4. The location display system of claim 3 wherein said calculator means arithmetically adds said input signals and said transducer output signal.

5. The location display system of claim 3 wherein said calculator means arithmetically substracts said transducer output signal from said input signals.

6. A mile post location display system for a vehicle comprising:

computing circuit means;

input means connected to said computing circuit means for entering digits of numbers representing an initial mile post designation and incrementing or decrementing commands into said computing circuit means;

means for generating a distance signal responsive to a predetermined distance traveled by the vehicle and for entering said distance signal into said computing circuit means, said computing circuit means incrementing or decrementing said initial mile designation in response to said distance signal to generate an output signal representing the location of the vehicle with respect to subsequent mile posts; and means for visually displaying said output signal generated by said computing circuit means.

7. The mile post location display system of claim 6 wherein said means for visually displaying said output signal generated by said computing circuit means comprises an array of light emitting diodes.

8. The mile post location display system of claim 7 wherein said means for generating a distance signal is responsive to a predetermined fraction of a mile traveled by the vehicle.

9. The mile post location display system of claim 8 wherein said computing circuit means arithmetically adds said distance signal to said initial mile post designation.

10. The mile post location display system of claim 8 wherein said computing circuit means arithmetically subtracts said distance signal from said initial mile post designation.

* * * * *